United States Patent [19]

Feinroth

[11] Patent Number: 5,182,077
[45] Date of Patent: Jan. 26, 1993

[54] WATER COOLED NUCLEAR REACTOR AND FUEL ELEMENTS THEREFOR

[75] Inventor: Herbert Feinroth, Silver Spring, Md.

[73] Assignee: Gamma Engineering Corporation, Rockville, Md.

[21] Appl. No.: 684,797

[22] Filed: Apr. 15, 1991

[51] Int. Cl.$^5$ ............................................. G21C 3/00
[52] U.S. Cl. ..................... 376/416; 376/414
[58] Field of Search ............. 376/416, 415, 417, 414; 138/177; 976/DIG. 53, DIG. 44, DIG. 46; 501/95

[56] References Cited

U.S. PATENT DOCUMENTS

| | | | |
|---|---|---|---|
| 2,950,238 | 8/1960 | Nicholson | 376/411 |
| 3,108,936 | 10/1963 | Gale | 376/426 |
| 3,252,868 | 5/1966 | Perilhou et al. | 376/457 |
| 3,607,025 | 9/1971 | Jacobson | 501/128 |
| 3,621,261 | 11/1971 | Princiotta | 250/106 S |
| 3,663,182 | 5/1972 | Hamling | 23/355 |
| 3,775,337 | 11/1973 | Wheatley et al. | 376/416 |
| 3,784,384 | 1/1974 | Webb | 106/39 |
| 3,928,130 | 12/1975 | Pawliw et al. | 376/416 |
| 3,986,528 | 10/1976 | Green | 138/177 |
| 4,045,288 | 8/1977 | Armijo | 376/417 |
| 4,047,965 | 9/1977 | Karst et al. | 106/65 |
| 4,297,246 | 10/1981 | Cairns et al. | 252/465 |
| 4,541,984 | 9/1985 | Palmer | 376/415 |

FOREIGN PATENT DOCUMENTS

| | | | |
|---|---|---|---|
| 222587 | 11/1958 | Australia . | |
| 1214334 | 9/1962 | Fed. Rep. of Germany | 376/457 |
| 1238281 | 2/1960 | France | 376/457 |
| 1375936 | 9/1963 | France | 376/457 |
| 56-84587 | 7/1981 | Japan | 376/457 |
| 923950 | 3/1961 | United Kingdom | 376/457 |

Primary Examiner—Brooks H. Hunt
Assistant Examiner—Meena Chelliah
Attorney, Agent, or Firm—Watson, Cole, Grindle & Watson

[57] ABSTRACT

A fuel rod for a water cooled nuclear reactor comprises a cladding made of a continuous wound ceramic fiber tube. The wound fibers are impregnated with a matrix to achieve a required density and exposed to ammonia gas to create a solid gel. The gel is fired to form a ceramic composite having desirable thermal properties, strength, corrosion resistance, toughness and neutron capture cross-section.

30 Claims, 5 Drawing Sheets

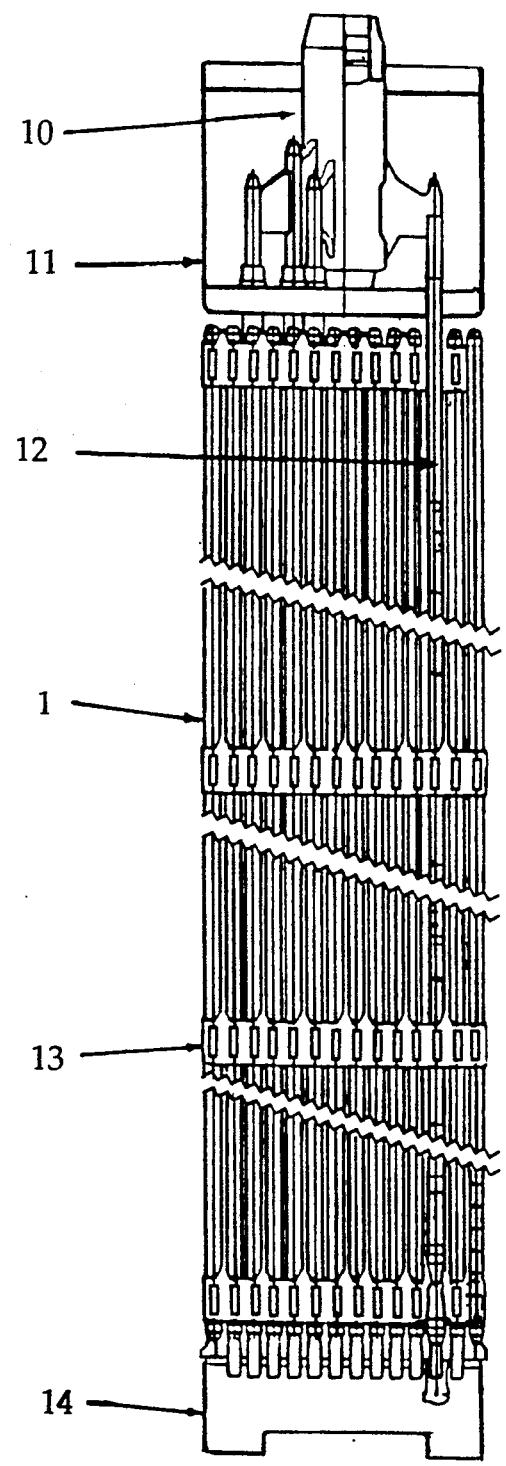
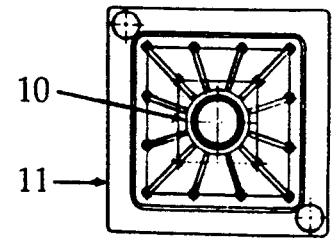
Fig. 2b
Fig 2a
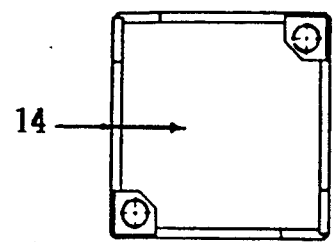
Fig. 2c

WATER COOLED NUCLEAR REACTOR AND FUEL ELEMENTS THEREFOR

BACKGROUND OF THE INVENTION

This invention relates elements for water cooled nuclear reactors and nuclear reactors which include the fuel elements. More particularly, the present invention relates to fuel elements having claddings made of a ceramic composite Cladding for water cooled reactor fuel elements has traditionally been made of ductile metal alloys such as zircaloy, an alloy of zirconium, or stainless steel, in order to provide the strength, corrosion resistance, pressure tightness to hold fission gases, and low neutron capture cross section. These characteristics are required to transfer heat reliably and safely from the contained nuclear fuel to the water coolant. The present metal alloy materials are satisfactory during normal operations. However, during accident situations involving overheating of the fuel, metal claddings have several serious drawbacks First, metal claddings lose much of their strength above 1000° F., and since accidents sometimes yield temperatures of 3000° F. and higher, they fail to contain the radioactive gases, and indeed the uranium oxide fuel, during such accidents. Such was the case during the accident at the Three Mile Island Nuclear Plant in 1979.

Secondly, they react exothermically with hot water above about 1500° F., thus adding additional heat to the decay heat which continues to be generated by the nuclear fuel. This additional heat exacerbates the severity and duration of the accident, as it did at Three Mile Island.

Thirdly, metal claddings produce hydrogen gas when reacting with water or steam above 1500° F. Hydrogen is a flammable gas which can react violently with air or oxygen creating additional damage and heat, and sometimes threatening the integrity of the reactor containment building. Nuclear plants often contain extensive hydrogen mitigation systems in an effort to prevent or mitigate the reaction of hydrogen with air and the threat to the integrity of the containment building.

Silicon carbide has been used as a cladding in gas cooled nuclear reactors. In water cooled reactors, however, it is desirable to provide a cladding that is inert in high temperature $H_2O$ Silicon carbide is not inert in high temperature $H_2O$ but rather reacts with $H_2O$ to produce hydrogen gas. The production of hydrogen gas poses the risk of a hydrogen explosion within the reactor containment building. Also, in high temperature $H_2O$, silicon carbide reacts exothermically which further produces undesirable heat in a reactor under accident conditions.

SUMMARY OF THE INVENTION

It is an object of the present invention to provide a fuel element which exhibits none of the above mentioned deficiencies, especially during accident situations. Specifically, the present invention provides a fuel element having a cladding which does not lose the bulk of its strength until very high temperatures (e.g. 3000° F.) are reached. The present invention further provides a fuel element having a cladding which is inert. An inert material, as used in this application, means a material which does not react with high temperature $H_2O$ to form hydrogen gas, and does not react exothermically in high temperature $H_2O$.

Another object of the present invention is to provide a water cooled nuclear reactor which is safe, reliable and economical to operate. The present invention improves the safety of water cooled nuclear power reactors and thus makes them less harmful to workers and the public in the event of accidents. While accidents which could lead to the overheating of the reactor core are extremely remote in modern water cooled reactors, they are still possible and have the potential to cause a release of radioactivity. The present invention significantly reduces the probability that such accidents, even if they occurred, would release radioactivity, either to the containment building or to the environment.

The present invention also improves the economics of water cooled nuclear power reactors by eliminating the need for expensive design features required to eliminate or mitigate the effects of hydrogen generated by an accident in a reactor having metal alloyclad fuel.

The present invention also reduces the regulatory obstacles to the licensing and construction of water cooled nuclear reactors, thus leading to lower financial risk by the investor and potential owner of new water cooled nuclear power reactors. A major component of present regulatory practice is the demonstration that the public safety will be maintained despite the loss of strength, exothermic reaction, and hydrogen production of existing metal alloy clad fuels.

The present invention achieves these objects and others by providing a fuel element having a continuous wound ceramic fibrous cladding instead of the metal alloy cladding currently used in water cooled reactors. Water cooled reactors comprise over 95% of the world's nuclear reactors.

According to the present invention, the cladding is made up of a ceramic composite preferably made from numerous micron-sized aluminum oxide fibers continuously wound to the same shape and geometric characteristic as a typical metal cladding tube. The wound fibers are impregnated with a zirconia or alumina matrix to achieve the required density, toughness and strength needed to provide a safe and reliable cladding. The fibers may be coated with a layer of zirconia or alumina before they are wound and impregnated. The result is a tough, rather than the traditional brittle, ceramic material. Herein, the term "tough" means having high resistance to crack propagation. Such composites have been developed and utilized in experimental applications for fossil fuel burning furnaces and heat exchanger applications. Carbonaceous composites have been used for aerospace and defense applications. The methods of making these composites are not considered a part of the present invention.

The invention may be more fully understood with reference to the accompanying drawings and the following description of the embodiments. The invention is not limited to the exemplary embodiments but should be recognized as contemplating all modifications within the skill of an ordinary artisan.

BRIEF DESCRIPTION OF THE DRAWINGS

FIG. 2a is a cross sectional view of a water cooled nuclear reactor fuel assembly having incorporated therein fuel elements according to the present invention;

FIG. 2b is a top view of the fuel assembly of FIG. 2a;

FIG. 2c is a bottom view of the fuel assembly of FIG. 2a;

DETAILED DESCRIPTION OF PREFERRED EMBODIMENTS

Figure 1A:
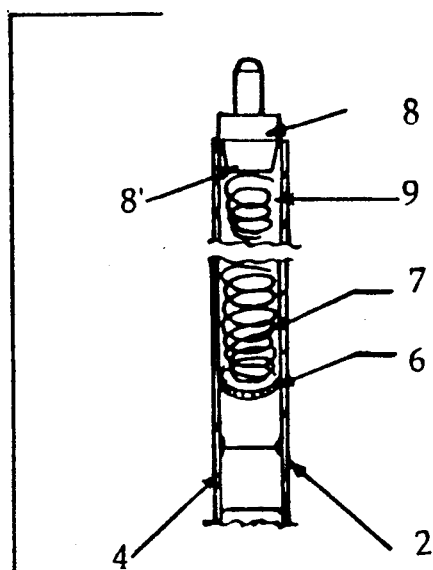
FIG. 1 is a cross sectional view of a fuel rod according to the present invention.
Figure 1B:
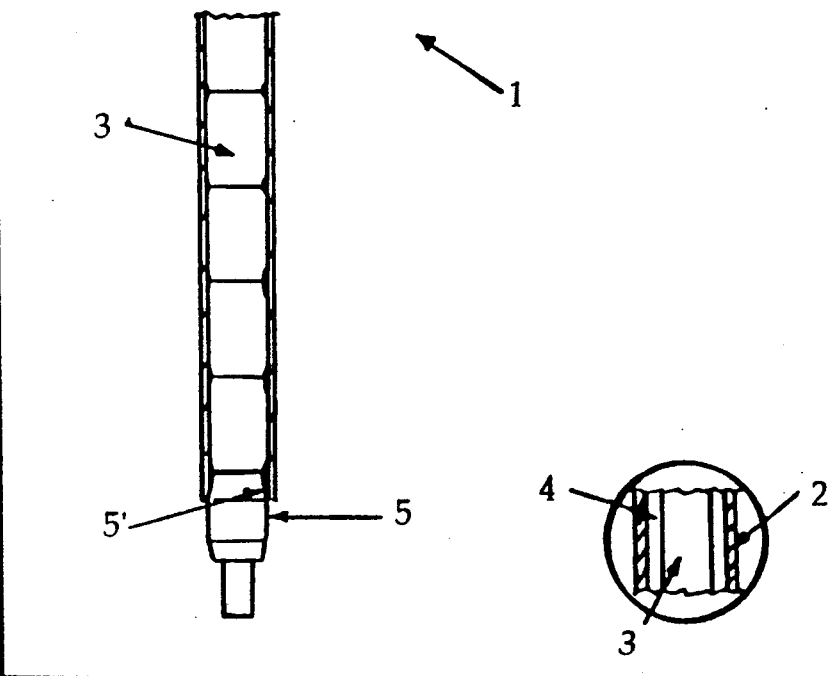

FIG. 1 shows a fuel element 1 in accordance with the present invention. The fuel element comprises a cladding 2 which surrounds a plurality of fuel pellets 3. A slight clearance 4 is provided between the fuel pellets 3 and the inside surface of the cladding 2 to facilitate insertion of the pellets into the cladding. The clearance 4 may be evacuated before sealing the fuel element, or it may be filled with helium, an effective heat transfer fluid. Before the pellets are inserted into the cladding, an end plug 5 is inserted into the bottom end of the cladding to seal the element at its bottom end. After the fuel pellets are inserted into the cladding, an insulator wafer 6 is inserted followed by an expansion spring 7 which holds the pellets 3 together in contact and allows for their expansion and growth during operation in a nuclear reactor. A closure plug 8 is finally sealed to the top end of the cladding to complete the fuel element structure.

Both the plugs and the interior surface of the ends of the cladding may be configured to provide greater surface contact area and greater joint strength to ensure a long life pressure-tight seal therebetween. For example, the end plug may be tapered at its end 5' as shown in FIG. 1, or the closure plug at its end 8, The plugs preferably comprise a monolithic or composite ceramic, more preferably alumina, which are inserted at each end of the tube and sealed using currently available ceramic to ceramic sealing techniques, for instance, by using a ceramic cement. Alternatively, one end of the tube can be closed during the winding process. The cladding 2, its end plug 5 and closure plug 8 define a chamber 9 as shown in FIG. 1. The chamber houses the fuel pellets, insulation wafer and expansion spring. The finished cladding is waterproof and gastight.

FIGS. 2a-2c show a fuel assembly for a water cooled nuclear reactor which contains a plurality of fuel elements 1 according to the present invention. The reactor includes a control rod 10 and a top nozzle 11. The top nozzle 11 rests on top of an assembly of fuel elements which assembly also contains control rods 12. Between the fuel elements are spring clip grid assemblies 13. On the bottom end of the fuel assembly is a bottom nozzle 14.

Figure 3:
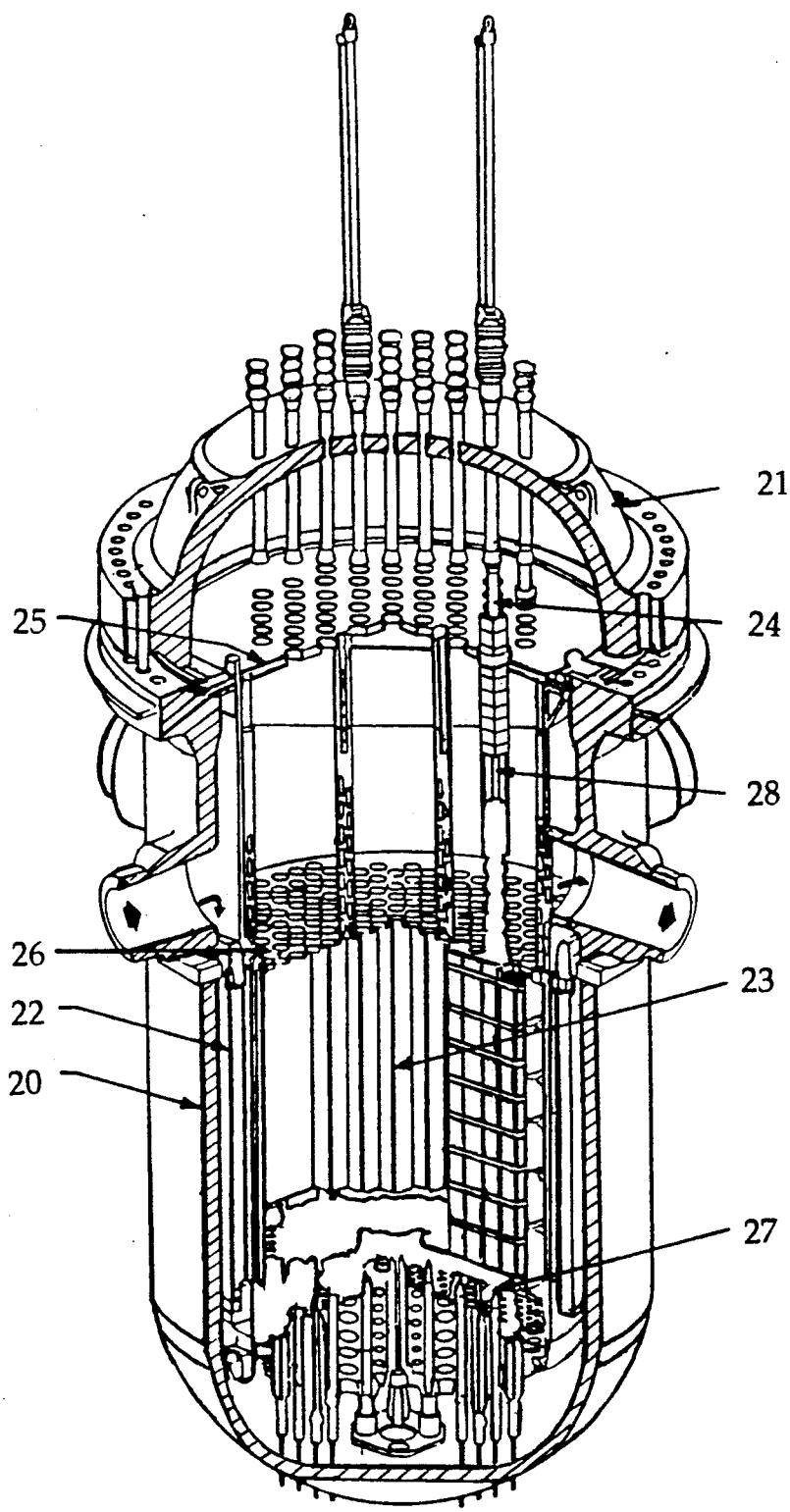
FIG. 3 is a cutaway view of a water cooled nuclear reactor.

FIG. 3 is a cutaway view of a water cooled nuclear reactor including fuel elements according to the present invention. The reactor is shown with some details omitted for the purpose of clarity. The reactor comprises a reactor vessel 20 and a closure head assembly 21. The vessel 20 has a thermal shield 22 designed to extend at least as far down into the vessel as a fuel assembly 23. The fuel assembly includes a plurality of fuel elements according to the present invention. The thermal shield 22 fits just inside the interior wall of the reactor vessel 20. Control rods 24 and fuel assemblies are positioned and held within the vessel by passing through aligned openings in an upper support plate 25, an upper core plate 26 and a lower core plate 27. The control rods 24 are driven by corresponding control rod drive shafts 28 to control the nuclear reaction.

The ceramic claddings of the fuel elements of the present invention comprise continuous fibers of ceramic materials which may be wound into a tubular shape and fired to produce a composite. The fibers are preferably wound in a helical configuration. There are several variations of precursor materials and processing parameters which can significantly improve the properties of the oxide ceramic cladding materials of the fuel elements of the present invention Precursor materials for the composites preferably comprise micron sized continuous fibers of a ceramic such as alumina or zirconia. The claddings may comprise continuous fibers consisting of about 80% alumina and about 20% zirconia, with a trace of yttria. The fibers are preferably between about 10 and about 20 microns in diameter. Such fibers have densities of about 4 gm/cm$^3$, tensile strengths of about 300,000 psi, and a melting point of about 3330° F.

The sol used to provide a matrix for the fibers preferably consists of submicron sized zirconia or alumina particles in an acid solution. The fibers are wound onto a rigid mandrel of about 0.3 inch outside diameter and having a length required for the finished fuel element Lengths of about 1.5 feet are typically used in current heavy water cooled reactors and lengths of about 12 feet are typically used in current light water cooled reactors.

The precursor fiber can be made of pure alumina. For example, experiments using a 10 micron alumina fiber have shown that this offers characteristics equivalent or better than the 80% alumina 20% zirconia principal embodiment.

Initial process steps are used to produce "green" prefires from the fibers. A bundle of about 400 fibers is passed through a stream of a sol and onto a continuously rotating mandrel controlling the winding angle to about 45°. Continuous wind overlapping through sufficient passes builds up the thickness of the preform to about 0.025 inch.

While continuing to rotate the tube, a quantity of ammonia gas is sprayed on the tube to convert the matrix sol to a gel. The gel is formed when the pH change of sol particles caused by the presence of the ammonia (changing it from acid to base) causes chemical linkages between the sol particles, thus converting the matrix from a liquid to a semi-solid. The preform is then dried at about 600° F. and removed from the mandrel.

The sol used during initial winding and impregnation can be made of alumina particles instead of zirconia. Although strength properties are slightly lower for an alumina matrix, there are other compensating product characteristics which can offset this strength loss.

The winding parameters, including the angle of winding, the number of layers, the type of mandrel and its coating, all can be varied to improve the final characteristics and the economy of the finished product. In addition, triaxial braiding of the fibers may be used to improve strength characteristics.

The preform is then fired in a kiln at about 1150° F. It is then removed from the kiln and inserted into a vacuum chamber where sol is introduced to build up the matrix. This process is repeated until weight gain has leveled off. Again the matrix is fired at about 1150° F. The matrix is again inserted in the vacuum chamber and the impregnations are repeated until the desired density has been achieved. A high density (greater than 95%) 1 to 2 mil thick coating of alumina or zirconia is then applied to the inside and outside surfaces of the tube using processes such as chemical vapor deposition or thermal spray. An end plug is then installed and sealed, if necessary.

Firing and impregnation parameters such as the exact firing temperatures and the number and nature of impregnation cycles can also be varied to assure an optimal balance between physical characteristics and cost of production.

To load the fuel element, standard sized uranium oxide fuel pellets are inserted into the tube. The expansion spring is then inserted and finally the closure plug, which is sealed to the tube as discussed above. The expansion spring may comprise steel or Inconel ®, a corrosion resistant alloy containing nickel, chromium and iron. To avoid melting of the spring due to the high temperatures of the fuel pellets (about 2000 degrees F.), the insulator wafer, typically made of alumina or zirconia, is placed between the spring and the pellets. Finished tubes are assembled into full sized fuel assemblies using current techniques. Special ceramic spacers may be provided between tubes in lieu of the spring clip grid assemblies to provide further stability to the fuel assembly during accident situations.

The proposed invention has satisfactory performance characteristics during normal reactor operating conditions (about 600° to 750° F. cladding external surface temperature), roughly equivalent to zircaloy cladding now used in commercial water reactors. It has superior performance characteristics at temperatures experienced during loss-of-coolant accidents (e.g. above 1000° F. cladding external surface temperature).

Figure 4:
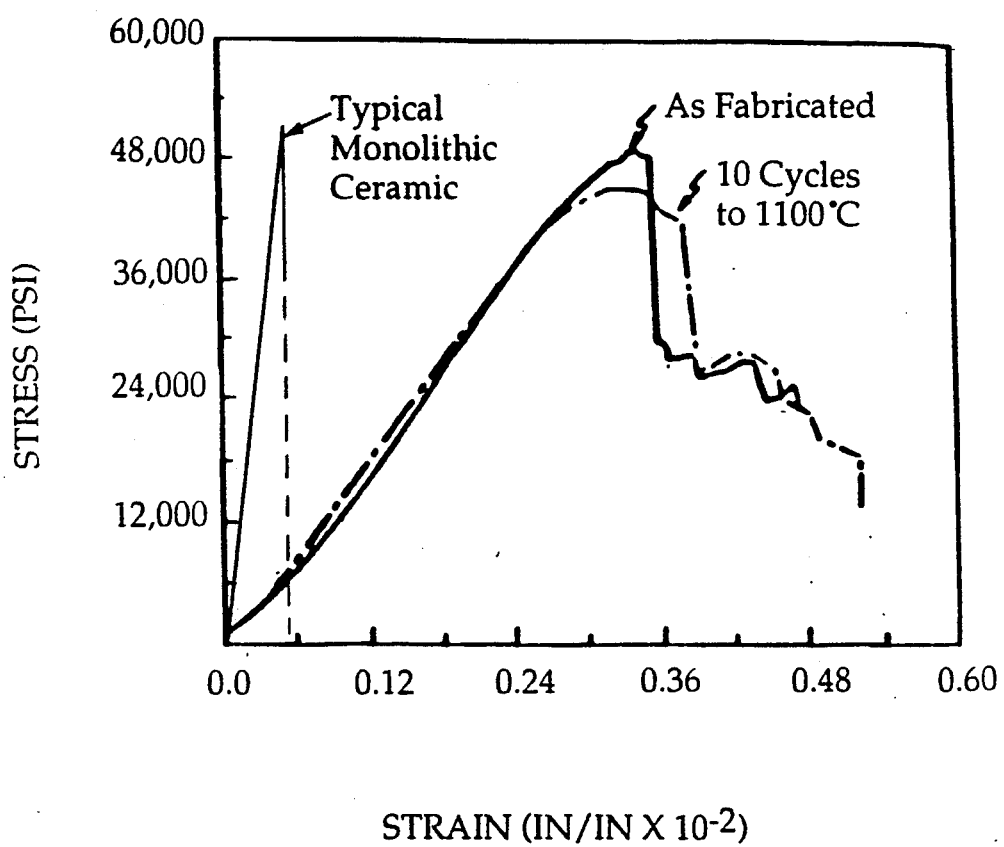
FIG. 4 is a graph showing stress/strain characteristics of an alumina/zirconia composite compared with a typical monolithic ceramic.

The ceramic composite behaves like a tough metal when subjected to a stress below its ultimate strength. FIG. 4 presents test results showing strain as a function of load for a composite made from alumina fibers as described above. The figure also shows how a typical "monolithic ceramic" behaves, i.e. in a brittle manner. It is this characteristic of improved toughness, and specifically the absence of brittle behavior, that makes it practical to consider ceramic composites for nuclear fuel cladding application. Note that even after reaching a stress which causes initial failure, the composite continues to carry additional load up to 150% of its initial elongation. This too is a characteristic of metals and thought not to be possible with monolithic ceramics.

Figure 5:
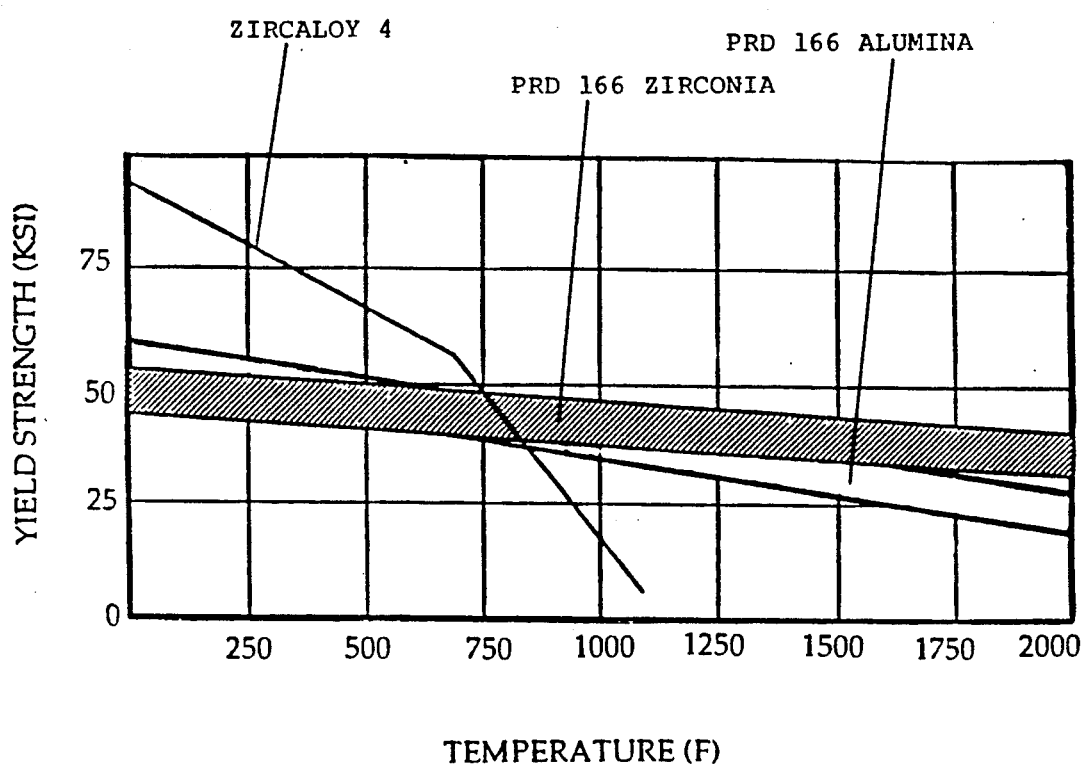
FIG. 5 is a graph showing the strength vs. temperature comparison of a zircaloy cladding to a filament wound oxide composite cladding.

FIG. 5 shows the yield strength versus temperature of the ceramic composite material of the present invention as compared to the traditional zircaloy cladding used in current commercial water reactors. Two ceramic composites are presented, one with an alumina matrix impregnated between the alumina fibers, and one with a zirconia matrix. Note that at normal reactor operating conditions (750° F. cladding external surface temperature) the yield strength of the two ceramic composites varies between 40 and 50 ksi as compared to zircaloy of 50 ksi. Also note that at 1100° F. the zircaloy looses virtually all of its strength whereas the composites maintain yield strength above 20 ksi to above 2000° F. The claddings of the fuel elements of the present invention also exhibit a high thermal shock resistance.

Thermal conductivity is a critical parameter for fuel cladding design. Zircaloy transmits heat very effectively and thus minimizes the temperature of the enclosed urania fuel pellets. The thermal conductivity of fully dense alumina is about 82% that of zircaloy. The conductivity of the composite is expected to be somewhat less because of its lower density. This reduced thermal performance can be accommodated in reactor design, partly by ignoring the effect of the oxide film on zircaloy, since there is none, and partly by appropriate modification to the fuel management scheme and resulting radial and axial peaking factors.

The composites also exhibit a high corrosion resistance. This is also critical to successful application in commercial reactor service where the normal cooling water temperature on the surface of the cladding is between 600° and 650° F. Tests on high density alumina operating in 650° F. water for about 2 days shows a corrosion behavior about the same as zircaloy, however, it is not known how the alumina corrosion behavior changes with longer exposure times. Zircaloy corrosion rates decrease after several days.

The neutron capture cross-section of alumina is slightly higher than zircaloy. This can be accommodated in light water reactors by appropriate adjustment of enrichment and coolant boration levels. In heavy water moderated CANDU reactors it will require a change in fuel management scheme or reduction in burnup. Heavy water reactors typically have much shorter fuel rods than light water reactors.

The characteristics of the ceramic composite clad after neutron irradiation are unknown. Its compatibility with $UO_2$ fuel is predicted to be similar to the compatibility of zircaloy with $UO_2$ fuel.

The toughness of the composite is thought to result in part from the complex interaction of the individual fibers with the matrix when responding to applied stress. Efforts to achieve higher thermal conductivity by increasing the density via additional impregnations generally reach a point where the material starts to behave like a monolithic structure, and the key advantages of toughness begin to be lost. In order to achieve the higher density, and therefore higher thermal conductivity, without losing the advantage of toughness, the individual fibers may be coated before they are assembled into a tow and wound. The coating can be either zirconia or alumina. Such coatings can yield composites with densities close to 90% of theoretical while still retaining the desirable interaction between fiber and matrix with resulting good toughness.

A principal advantage of this invention is the absence of reaction with high temperature $H_2O$ during a loss of coolant accident. That is the reason that the principal embodiment involves an oxide ceramic which is inert in high temperature $H_2O$.

Other combinations of fibers and matrices also make useful fuel element claddings. One example includes yttria alumina garnet (YAG) in an alumina matrix. When alternative materials are used, the closure plugs or end plugs are preferably also made of the same alternative material.

While claddings of present commercial reactors are generally tubular in shape, there are some exceptions. The Shippingport reactor utilized flat plates for the seed portion of the reactor, and reactors used for ship propulsion use plate type fuel. In this embodiment, the cladding is fabricated in shapes such as flat plates via weaving or braiding processes in which the fibers are woven or braided into a fabric, then shaped to create a pocket for a fuel wafer, and then impregnated and fired as above. This provides a cladding which only needs to be sealed on one side. Final sealing may be accomplished by methods as described with respect to the sealing of the final closure plugs discussed above. This has application for research reactors, military applications, as well as possible advanced reactor designs yet to be developed.

EXAMPLE

In a preferred embodiment of the present invention, a ceramic composite tube is made by impregnating a tow of alumina (80%)-zirconia (20%) fibers with a zirconia sol and then continuously winding this tow of fibers on a mandrel. A tow of fibers consists of about 400 individual fibers each roughly 20 microns in diameter. The mandrel has an outside diameter which is equivalent to the desired inside diameter of the finished light water reactor cladding tube (roughly 0.3 to 0.5 inch). Enough layers are wound to yield the required thickness (between about 0.02 and 0.05 inch) after which the composite is sprayed with ammonia gas to create a solid gel. The composite is then dried in an oven, removed from the mandrel, fired in a kiln at about 1150° F., and then reimpregnated several times with additional sol materials and refired several times to build up the matrix to 70% or more of theoretical density. The additional sol materials are preferably submicron sized alumina particles in an acid solution. This product is then coated with a high density alumina or zirconia coating using a process such as chemical vapor deposition (CVD) or thermal spray to provide an adequate surface finish and assure impermeability to fission gases. The finished tube is then loaded with urania fuel pellets as in current water cooled reactor fuel elements, and alumina end caps are installed and cemented in place.

Although the present invention has been described in connection with preferred embodiments, it will be appreciated by those skilled in the art that additions, modifications, substitutions and deletions not specifically described may be made without departing from the spirit and scope of the invention defined in the appended claims.

I claim:

1. A fuel element for a water cooled nuclear reactor comprising, a cladding defining a closed waterproof gastight chamber therewithin, and nuclear fuel means disposed withins aid chamber, the major portion of said cladding being formed of a fibrous ceramic composite material an dhaving a high density ceramic coating thereon which is impermeable to fission gases, said composite material comprising a tow of ceramic fibers surrounded by a continuous matrix of ceramic oxide, said cladding being inert in high temeprature $H_2O$, being strong, tough, and having high thermal shock resistance and low neutron capture cross-section.

2. A fuel element as defined in claim 1, wherein said cladding comprises continuously wound ceramic fibers.

3. A fuel element as defined in claim 1, wherein said cladding is substantially entirely formed of a fibrous ceramic composite material.

4. A fuel element as defined in claim 1, wherein said ceramic comprises at least one member selected from the group consisting of alumina, zirconia, yttria and yttria alumina garnet.

5. A fuel element as defined in claim 1, wherein said cladding is tubular and has an inside diameter of between about 0.3 and 0.5 inch.

6. A fuel element as defined in claim 1, wherein said cladding has an average wall thickness of between about 0.02 and about 0.05 inch.

7. A fuel element as defined in claim 1, wherein said cladding is substantially rectangular and said fuel means is substantially rectangular.

8. A fuel element for a water cooled nuclear reactor, comprising:
a cladding of tubular construction having an open end;
means closing said open end to define a closed waterproof gastight chamber within said cladding; and
nuclear fuel means disposed within said chamber,
said cladding being formed of a fibrous ceramic composite material and having a high density ceramic coating thereon which is impermeable to fission gases, said composite material comprising a tow of ceramic fibers surrounded by a continuous matrix of ceramic oxide that is inert in high temperature $H_2O$, strong, tough, and has a high thermal shock resistance, and low neutron capture cross-section.

9. A fuel element as defined in claim 8, wherein said cladding of tubular construction includes a second open end opposite said first-mentioned open end, and means closing said second open end.

10. A fuel element as defined in claim 8, wherein said nuclear fuel means comprises a plurality of nuclear fuel pellets.

11. A fuel element as defined in claim 10, wherein said fuel pellets are movably disposed within said tubular cladding, said fuel element further including an expansion spring disposed within said tubular cladding to force said fuel pellets into contact with one another and to allow for expansion and growth of the pellets during operation in a nuclear reactor.

12. A fuel element as defined in claim 11, further comprising an insulation wafer disposed between said spring and said fuel pellets to thermally insulate said expansion spring from said fuel pellets.

13. A fuel element as defined in claim 8, wherein one end of said tubular cladding is formed integral with said cladding.

14. A fuel element as defined in claim 8, wherein said means closing said open end comprises a ceramic plug.

15. A fuel element as defined in claim 14, wherein said ceramic plug comprises at least one member selected from the group consisting of alumina, zirconia, yttria and yttria alumina garnet in a monolithic form.

16. A fuel element as defined in claim 14, wherein said ceramic plug comprises at least one member selected from the group consisting of alumina, zirconia, yttria and yttria alumina garnet in a composite form.

17. A fuel element as defined in claim 8, wherein said cladding has thereon a uniform thin coating of high density alumina.

18. A fuel element as defined in claim 8, wherein said ceramic comprises at least one member selected from the group consisting of alumina, zirconia, yttria and yttria alumina garnet.

19. A fuel element as defined in claim 18, wherein said ceramic comprises approximately 80% alumina and approximately 20% zirconia.

20. A fuel element as defined in claim 8, wherein said cladding formed of a fibrous ceramic composite material comprises ceramic fibers in a matrix.

21. A fuel element as defined in claim 20, wherein said fibers have an average diameter of between about 10 and 20 microns.

22. A fuel element as defined in claim 20, wherein said fibers are continuous from one end of the cladding to the other end.

23. A fuel element as defined in claim 22, wherein said fibers are disposed in a helical configuration.

24. A fuel element as defined in claim 14, wherein said ceramic plug is cemented in place.

25. In combniation, a nuclear reactor including a pressure vessel, water disposed within said vessel, and a fuel assembly disposed in contact with said water, said fuel assembly including a plurality of fuel elements, each fuel element comprising a cladding defining a closed waterproof gastight chamber therewithin and nuclear fuel means disposed within said chamber, the major portion of said cladding being formed of a fibrous ceramic composite material and having a highd ensity ceramic coating thereon which is impermeable to fission gases, said composite material comprising a tow of ceramic fibers surrounded by a continuous matrix of ceramic oxide, said cladding being inert in high temperature $H_2O$, strong, tough, and having a high thermal shock resistance and a low neutron capture cross-section.

26. In combination, a nuclear reactor including a pressure vessel, water disposed within said vessel, and a fuel assembly disposed in contact with said water, said fuel assembly including a plurality of fuel elements, each fuel element comprising:
   a cladding of tubular construction having an open end;
   means closing said open end to define a closed waterproof gastight chamber within said cladding; and
   nuclear fuel means disposed within said chamber,
   said cladding being formed of a fibrous ceramic composite material and having a high density ceramic coating thereon which is impermeable to fission gases, said composite material comprising a tow of ceramic fibers surrounded by a continuous matrix of ceramic oxide that is inert in higher temperature $H_2O$, strong, tough, and has a high thermal shock resistance and low neutron capture cross-section.

27. A fuel element for a water cooled nuclear reactor comprising, a cladding defining a closed waterproof gastight chamber therewithin, and nuclear fuel means disposed within said chamber, the major portion of said cladding being formed of a fibrous ceramic composite material comprising continuously wound ceramic fibers having an average diameter of between about 10 and 20 microns, said cladding being inert in high temperature $H_2O$, being strong, tough, and having high thermal shock resistance and low neutron capture cross-section.

28. A fuel element for a water cooled nuclear reactor, comprising:
   a cladding of tubular construction having an open end;
   means closing said open end to define a closed waterproof gastight chamber within said cladding; and
   nuclear fuel means disposed within said chamber,
   said cladding being formed of a fibrous ceramic composite material comprising continuously wound ceramic fibers having an average diameter of between about 10 and 20 microns, said cladding being inert in high temperature $H_2O$, strong, tough, and having a high thermal shock resistance, and low neutron capture cross-section.

29. In combination, a nuclear reactor including a pressure vessel, water disposed within said vessel, and a fuel assembly disposed in contact with said water, said fuel assembly including a plurality of fuel elements, each fuel element comprising a cladding defining a closed waterproof gastight chamber therewithin and nuclear fuel means disposed within said chamber, the major portion of said cladding being formed of a fibrous ceramic composite material comprising continuously wound ceramic fibers having an average diameter of between about 10 and 20 microns, said cladding being inert in high temperature $H_2O$, strong, tough, and having a high thermal shock resistance and a low neutron capture cross-section.

30. In combination, a nuclear reactor including a pressure vessel, water disposed within said vessel, and a fuel assembly disposed in contact with said water, said fuel assembly including a plurality of fuel elements, each fuel element comprising:
   a cladding of tubular construction having an open end;
   means closing said open end to define a closed waterproof gastight chamber within said cladding; and
   nuclear fuel means disposed within said chamber,
   said cladding being formed of a fibrous ceramic composite material comprising continuously wound ceramic fibers having an average diameter of between about 10 and 20 microns, said cladding being inert in high temperature $H_2O$, strong, tough, and having a high thermal shock resistance, and low neutron capture cross-section.

* * * * *